US010069551B2

(12) United States Patent
Jo et al.

(10) Patent No.: US 10,069,551 B2
(45) Date of Patent: Sep. 4, 2018

(54) ELECTRONIC DEVICE AND METHOD OF PERFORMING WIRELESS COMMUNICATION USING BEAMFORMING THEREOF

(71) Applicant: Samsung Electronics Co., Ltd., Suwon-si (KR)

(72) Inventors: Ohyun Jo, Seoul (KR); Changyeul Kwon, Seongnam-si (KR); Donghwi Roh, Seoul (KR); Doyoung Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 65 days.

(21) Appl. No.: 15/053,957

(22) Filed: Feb. 25, 2016

(65) Prior Publication Data
US 2016/0277088 A1 Sep. 22, 2016

(30) Foreign Application Priority Data
Mar. 17, 2015 (KR) .......................... 10-2015-0036939

(51) Int. Cl.
| H04B 7/06 | (2006.01) |
| H04W 72/04 | (2009.01) |
| H04L 5/00 | (2006.01) |
| H04B 7/0408 | (2017.01) |

(52) U.S. Cl.
CPC ......... *H04B 7/0617* (2013.01); *H04B 7/0408* (2013.01); *H04L 5/0023* (2013.01); *H04W 72/046* (2013.01)

(58) Field of Classification Search
CPC .... H04B 7/0408; H04B 7/0617; H04L 5/0023
See application file for complete search history.

(56) References Cited

U.S. PATENT DOCUMENTS

| 2008/0181180 | A1* | 7/2008 | Karaoguz | ............ H04B 7/0408 370/331 |
| 2014/0055302 | A1* | 2/2014 | Jia | ............................ H01Q 3/34 342/372 |

* cited by examiner

*Primary Examiner* — Yemane Mesfin
*Assistant Examiner* — Henry Baron
(74) *Attorney, Agent, or Firm* — McAndrews, Held & Malloy, Ltd.

(57) ABSTRACT

Various embodiments of the present disclosure provide an electronic device and a method of performing wireless communication using beamforming provided. The electronic device for performing wireless communication using beamforming includes: a communication unit for communicating signals with a correspondent node; a memory for storing a beamforming setup table; and a controller for: identifying identification information regarding the correspondent node based on at least one of schedule information, a reception packet and a transmission packet; identifying beamforming setup information corresponding to the identification information identified regarding the correspondent node, from the beamforming setup table; and establishing a beamforming link with the correspondent node based on the beamforming setup information, to communicate data via the link. The disclosure is not limited to the embodiments. The embodiments can be modified to other examples.

20 Claims, 17 Drawing Sheets

ELECTRONIC DEVICE AND METHOD OF PERFORMING WIRELESS COMMUNICATION USING BEAMFORMING THEREOF

RELATED APPLICATION(S)

This application claims priority from and the benefit under 35 U.S.C. § 119(a) of Korean Patent Application No. 10-2015-0036939, filed on Mar. 17, 2015, which is hereby incorporated by reference for all purposes as if fully set forth herein.

BACKGROUND

The present disclosure relates to an electronic device and a method of performing wireless communication using beamforming thereof.

In recent years, with the rapid development of wireless communication technology, users of wireless communication terminals have demanded various services. Applications of wireless communication terminals demand transmission and reception of a large amount of data. Users also want high speed transmission and reception of a large amount of data at high speed. To comply with these demands, various schemes have been proposed to efficiently use radio frequency resources. From among the schemes, beamforming is a technique which has recently attracted attention.

When a terminal connects to an access point (AP) or another terminal for the first time or when the terminal has maintained the connection, if the environment or the location of the terminal changes, the terminal cannot detect which one of the beams transmitted from the AP and the other terminal is optimal. The terminal cannot also detect which one of the beams it receives is optimal. In addition, with respect to a beam transmitted by the terminal and a beam received by an AP or another terminal, the terminal cannot detect which transmitting beam/receiving beam is optimal. Therefore, the terminal and the AP or other terminals need to efficiently search for the optimal transmitting beam/receiving beam.

The Institute of Electrical and Electronics Engineers (IEEE) 802.11ad describes an optimum beam searching scheme for wireless local area network (LAN)/personal area network (PAN). Referring to IEEE 802.11ad standard specification, beamforming is disclosed as it is performed in a wireless LAN/PAN environment at a band of 60 GHz which is higher than that of conventional mobile communication. Electric signals can be transmitted in a corresponding direction via beamforming. When a terminal needs to communicate with a plurality of nodes via beamforming, proper beams are set for nodes respectively and communications are made with corresponding nodes by the set beams. Different beams may be used according to correspondent nodes.

SUMMARY

Wireless communication systems using a relatively high frequency band experience serious signal attenuation depending on distances between a transmitter and a receiver. Therefore, signals of a relatively high frequency band needs to be processed via beamforming. When beams for beamforming are searched each time that correspondent nodes are changed, a large amount of overhead is created. When the data transmission interval is reduced due to frequent beam search processes, the processing is also decreases, and a real time service susceptible to a delay time, such as video streaming, cannot be provided to a plurality of links, in real time.

The present disclosure has been made to address the above problems and disadvantages, and to provide at least the advantages described below. Accordingly, an aspect of the present disclosure provides an electronic device and a method of performing wireless communication using beamforming thereof.

In accordance with an aspect of the present disclosure, an electronic device for performing wireless communication using beamforming is provided. The electronic device includes: a communication unit that communicates signals with a correspondent node; a memory that stores a beamforming setup table; and a controller that: identifies identification information regarding the correspondent node based on at least one of schedule information, a reception packet and a transmission packet; identifies beamforming setup information corresponding to the identification information regarding the correspondent node that has been identified, from the beamforming setup table; and establishes a beamforming link with the correspondent node based on the beamforming setup information, to communicate data via the beamforming link.

In accordance with another aspect of the present disclosure, a method for an electronic device to perform wireless communication using beamforming is provided. The method includes: identifying identification information regarding a correspondent node based on at least one of schedule information, a reception packet and a transmission packet; identifying beamforming setup information corresponding to the identification information regarding a correspondent node, from a beamforming setup table; and establishing a beamforming link with the correspondent node based on the beamforming setup information, to communicate data via the beamforming link.

BRIEF DESCRIPTION OF THE DRAWINGS

The above and other aspects, features and advantages of the disclosure will be more apparent from the following detailed description, taken in conjunction with the accompanying drawings, in which.

DETAILED DESCRIPTION

Figure 1:
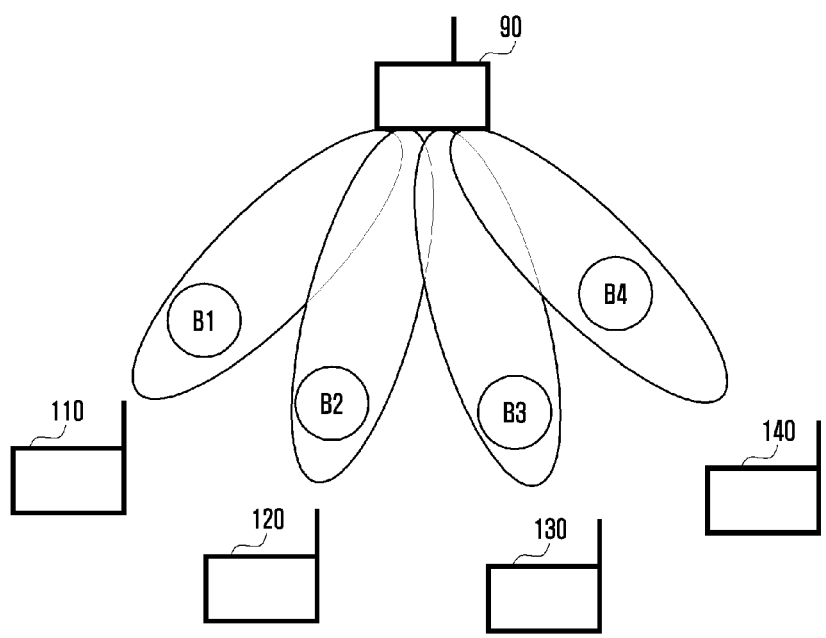
FIG. 1 is a diagram that describes beamforming according to embodiments of the present disclosure.

Hereinafter, embodiments of the present disclosure are described in detail with reference to the accompanying drawings. It will be easily appreciated to those skilled in the art that various modifications, additions and substitutions are possible from the embodiments of the present disclosure that are illustrated and described in detail in the following description, and the scope of the present disclosure should not be limited to the following embodiments. The embodiments of the present disclosure are provided such that those skilled in the art can completely understand the present disclosure. It should be understood that the present disclosure may include all modifications and/or equivalents and/or substations included in the idea and technical scope of the present description. In the drawings, the same or similar elements are denoted by the same reference numerals even though they are depicted in different drawings.

The expressions such as "include" and "may include" which may be used for the embodiments of the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only is the component directly connected or accessed to the other component, but also another component may exist between the component and the other component. Meanwhile, in the case where according to which a component is referred to as being "directly connected" or "directly accessed" to the other component, it should be understood that there is no component therebetween.

The terms used in the present disclosure are only used to describe specific various embodiments, and are not intended to limit the present disclosure. Singular forms are intended to include plural forms unless the context clearly indicates otherwise.

Unless otherwise defined, all terms including technical and/or scientific terms used herein have the same meaning as commonly understood by one of ordinary skill in the art to which the disclosure pertains. In addition, unless otherwise defined, all terms defined in generally used dictionaries may not be overly interpreted.

FIG. 1 is a diagram that describes beamforming according to embodiments of the present disclosure.

Referring to FIG. 1, the wireless communication system includes a plurality of correspondent nodes 90, 110, 120, 130, 140, where the correspondent node 90 may search for optimum beams to make wireless communication with the correspondent nodes 110, 120, 130, and 140, respectively, and set up the searched optimum beams B1, B2, B3, and B4 for communication of data. For example, the correspondent node 90 may be an AP or a terminal. A process for the correspondent node 90 to search for optimum beams for the correspondent nodes 110, 120, 130, 140 is called 'beam searching process.' When the correspondent node 90 needs to be connected to the correspondent nodes 110, 120, 130, 140, the correspondent node 90 may repeat the beam searching process to search for optimum beams for the correspondent nodes 110, 120, 130, 140, respectively.

For example, Sector Level Sweep (SLS) refers to a protocol for link detection. SLS enables nodes to continuously transmit particular frames containing the same content only by changing the direction of the beam. When frames are successfully received, the direction of beam is determined from one of the frames, which was received with the highest indicator (e.g., signal-to-noise (SNR), received signal strength indicator (RSSI), etc.) indicating link performance. An SLS beam ID can be obtained by the SLS protocol.

For example, Beam Refinement Protocol (BRP) refers to a protocol that minutely refines the direction searched via SLS to maximize the data rate. BRP allows for a beam search process using BRP frames specifically defined for BRP protocol. A BRP frame may include information for a beam search process and information for reporting the search results. BRP frames are transmitted using beams that have been determined by a beam search process. When a corresponding BRP frame is successfully received, a training sequence attached to the end of the BRP frame may actually be used to train a beam. While SLS uses frames for a beam search process, BRP uses a training sequence of a simple structure. That is, a beam search process may be successful only when BRP frames are successfully received. A BRP beam ID can be obtained by the BRP protocol.

Beam Tracking (BT) refers to a method of performing a beam search process simultaneously while transmitting data. BT receives data via the data frame of which the end includes a training sequence for a beam search process, and allows for an additional beam search process right after the reception of data. Information for a beam search process may be contained in a physical layer (PHY) header.

In a state where a plurality of nodes exist, the method describe above may cause a large amount of overhead if a beam search process is performed each time that correspondent nodes are changed.

Figure 2A:
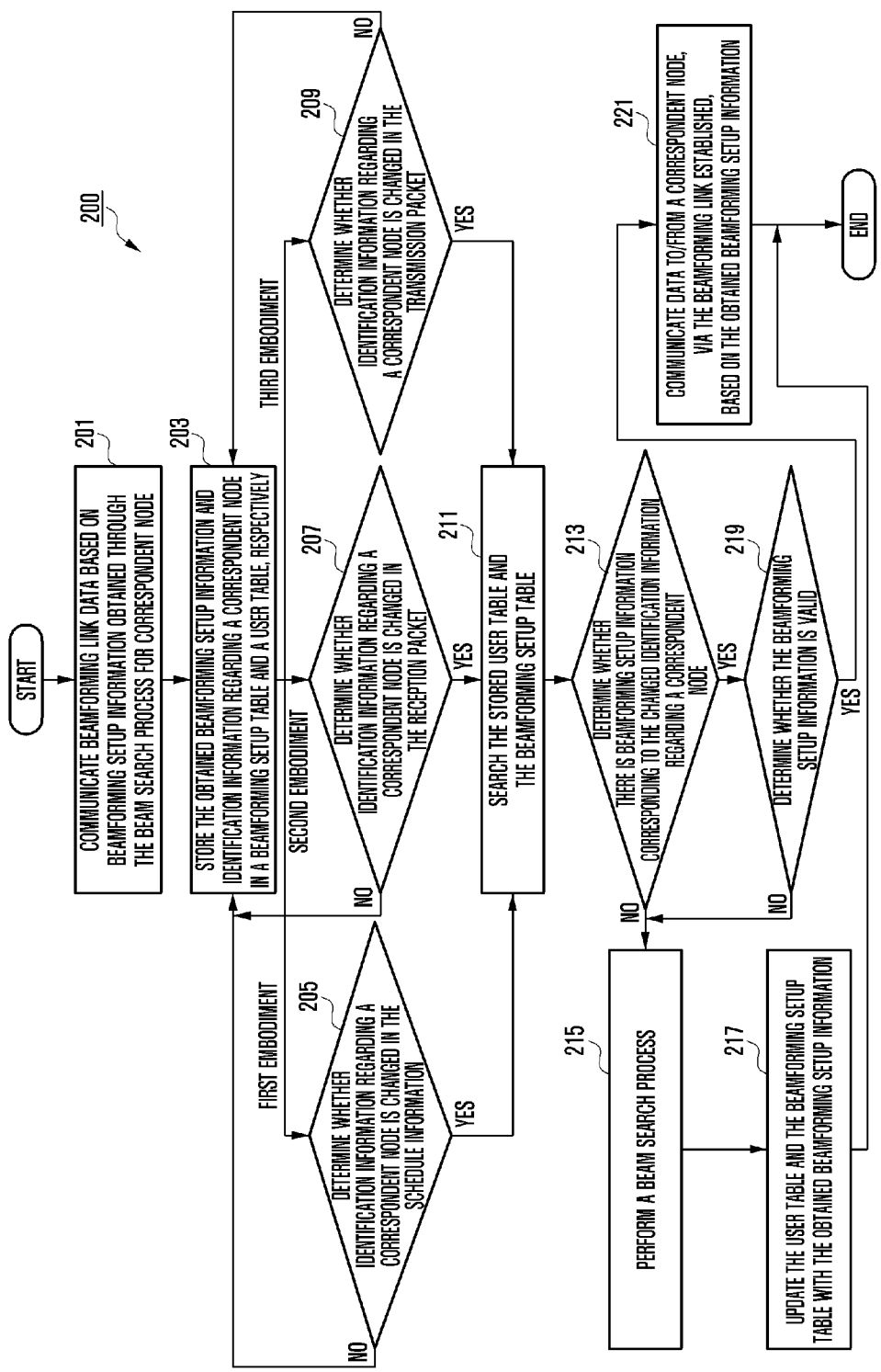
FIG. 2A is a flow diagram that describes a communication method using beamforming according to various embodiments of the present disclosure.

FIG. 2A is a flow diagram that describes a method or a process 200 for an electronic device to make a communication using beamforming according to various embodiments of the present disclosure.

The electronic device 100 according to various embodiments of the present disclosure (e.g., the correspondent node 90 shown in FIG. 1) may include an AP or a terminal to make a wireless communication using beamforming in a wireless communication system.

The electronic device 100 according to various embodiments of the present disclosure may use schedule information, user information, etc., contained in data packets to re-set an optimum beam corresponding to a condition, without performing a beam search process to reset a beam. Therefore, the electronic device 100 can increase the amount of data transmission and resolve the service delay.

Referring to FIG. 2A, when the electronic device 100 does not collect initial beamforming setup information for correspondent nodes, the electronic device 100 may perform a beam search process for correspondent nodes in operation 201. The electronic device 100 may establish beamforming links based on the beamforming setup information obtained through the beam search process, and communicate data via corresponding links. The beamforming setup information according to embodiments of the present disclosure may include at least one of the following: an SLS beam ID; a BRP beam ID; an antenna module ID for selecting an antenna module; antenna mode information for selecting an antenna array; and radio frequency (RF) mode information for selecting one or more antenna elements in the selected antenna array.

Figure 2B:
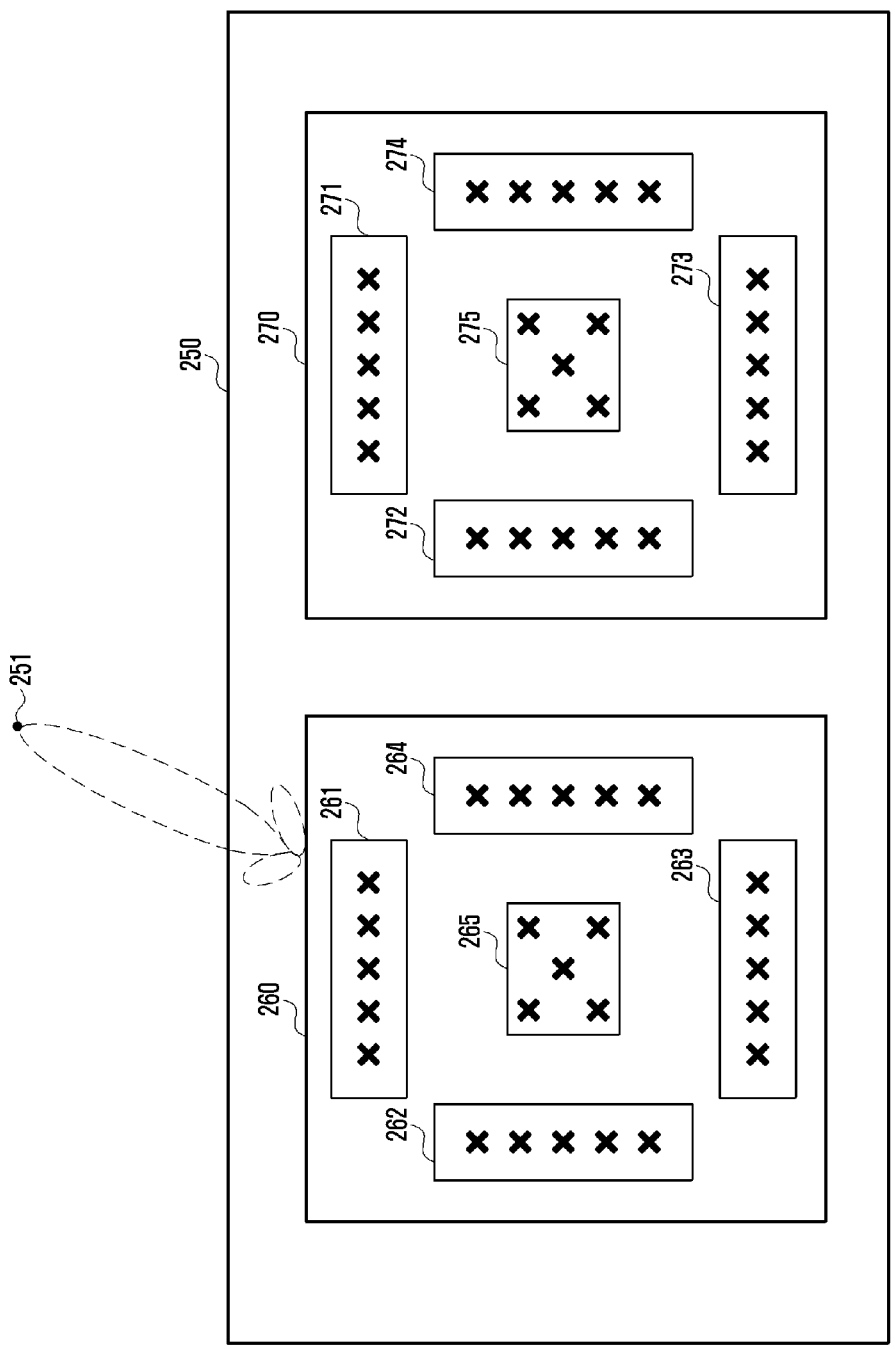
FIG. 2B is a schematic diagram showing a communication unit of an electronic device when beamforming is set, according to an embodiment of the present disclosure.

Referring to FIG. 2B, the electronic device 100 may include a communication unit 250 to communicate (including transmitting and/or receiving) data. The communication unit 250 may include a plurality of antenna modules, e.g., a first antenna module 260 and a second antenna module 270. For example, the first antenna module 260 may include a plurality of antenna arrays 261~265 in the area, arranged at the top and bottom/the left and right/the center. The second antenna module 270 may include a plurality of antenna arrays 271~275 on the area, arranged at the top and bottom/the left and right/the center. Each of the antenna arrays 261~265 and 271~275 may include a plurality of antenna elements. As shown in FIG. 2B, antenna elements may be configured to have polarization characteristics in a vertical (V)/horizontal (H) direction. The antenna elements may also be configured to have a polarization characteristic in the direction of +45/−45° created as the vertical (V) and horizontal (H) polarizations are combined.

In another embodiment of the present disclosure, the individual antenna elements may be broadside antennas or end-fire antennas. The broadside antenna is an antenna where the beam-steering direction is identical to the normal direction to the plane in which the individual antenna elements are arrayed. The end-fire antenna is an antenna where the beam-steering direction is in the plane in which the individual antenna elements are arrayed.

When the electronic device 100 performs a beam search process for a correspondent node 251, it may obtain a search result. When the search result contains an SLS beam ID, a BRP beam ID, an antenna module ID for selecting the first antenna module 260, antenna mode information related to the beam-steering direction or polarization characteristics of the individual antenna elements, and a particular antenna array includes a plurality of RF modules, RF mode information controlling the beam width of the antenna array may be obtained as beamforming setup information as the plurality of RF modules in the antenna array are turned on/off.

According to an embodiment of the present disclosure, the antenna mode information may be set to an H/V polarization or a +45/−45° polarization or may be obtained in relation to polarization characteristics. The antenna mode information may also be set to a broadside antenna or an end-fire antenna or may be obtained in relation to beam-steering directions.

In another embodiment of the present disclosure, RF mode information may be set or obtained to select four antenna elements from the right end in the top antenna array 261. The plurality of RF modules may be one-to-one connected to the antennas elements or may be to sub-arrays each of which is formed with two or more antenna elements, respectively. For example, when the top antenna array 261 is configured to include eight antenna elements, the antenna elements are connected to RF modules, one-to-one, or based on groups each of which includes two or four antenna elements. The method of connecting individual RF modules and antenna arrays may be represented using preset bitmap information.

In addition, beamforming setup information may further include location information regarding a correspondent node 241, e.g., distance, angle, etc. The distance and angle may be obtained by various sequences for obtaining location information or sensors.

Referring back to FIG. 2A, the electronic device 100 may store the obtained beamforming setup information and identification information regarding a correspondent node in a beamforming setup table and a user table, respectively, in operation 203. The user table may be mapped to the beamforming setup table. That is, a location of beamforming setup information regarding a correspondent node may be determined in the beamforming setup table, according to the identification information regarding a correspondent node included in the user table. The user table and the beamforming setup table may be stored in a memory (not shown). Table I and Table II are examples of the user table and the beamforming setup table respectively.

TABLE I

| User index | AID | media access control (MAC) address |
|---|---|---|
| 1 | 10 | AA-AA-AA-AA-AA-AA |
| 2 | 12 | BB-BB-BB-BB-BB-BB |
| 3 | — | CC-CC-CC-CC-CC-CC |
| 4 | 16 | DD-DD-DD-DD-DD-DD |

TABLE II

| SLS beam ID | BRP beam ID | Antenna module ID | Antenna mode | RF mode | Distance | Angle |
|---|---|---|---|---|---|---|
| 1 | 3 | 1 | 3 | 2 | 2 | 10 |
| 2 | 4 | 1 | 3 | 1 | 2 | 10 |
| 1 | 2 | 3 | 2 | 1 | 3 | 30 |
| 1 | — | 2 | — | — | 4 | 20 |

In Table I, the user index is an example of identification information regarding a correspondent node. For example, the electronic device 100 may identify identification information regarding a correspondent node from a media access control (MAC) address of a correspondent node included in the transmission/reception or communication packet or an Associated ID (AID) of a correspondent node included in schedule information, e.g., a user index, from the user table. After that, the electronic device 100 may store the beamforming setup information mapped to the corresponding user index in the beamforming setup table.

The electronic device 100 may use the following information to perform a fast beam-switching process in communicating data with a correspondent node.

1) Scheduling AID information in the beacon or announcement frame
2) Transmission MAC address of received packets
3) Reception MAC address of created packets As a first embodiment, the electronic device 100 may determine whether a correspondent node is changed using schedule information contained in an announcement frame or a beacon in operation 205. For example, the electronic device 100 may identify AID information in the schedule information and determine whether identification information regarding a correspondent node is changed in the user table. The schedule information may be created in a source node to transmit data, or a destination node to receive data.

As a second embodiment, the electronic device 100 may determine whether a correspondent node is changed, using a MAC address of a source node, contained in a reception packet, in operation 207. For example, the electronic device 100 may identify a MAC address of a source node, contained in a reception packet, and determine whether identification information regarding a correspondent node is changed in the user table.

As a third embodiment, the electronic device 100 may determine whether a correspondent node is changed, using a MAC address of a destination node, contained in a transmission packet to be transmitted, in operation 209. For example, the electronic device 100 may identify a MAC address of a destination node, contained in a transmission packet, and determine whether identification information regarding a correspondent node is changed in the user table.

When the electronic device 100 ascertains that the identification information regarding a correspondent node is changed, according to one of embodiments 1, 2, and 3, the electronic device 100 may search the stored user table and the beamforming setup table for beamforming setup information corresponding to the changed identification information regarding a correspondent node in operation 211.

The electronic device 100 may determine whether there is beamforming setup information corresponding to the changed identification information regarding a correspondent node in operation 213. When the electronic device 100 ascertains that there is not beamforming setup information corresponding to the changed identification information regarding a correspondent node in operation 213, it performs a beam search process for the corresponding correspondent node, similar to operation 201, in operation 215, and then updates the user table and the beamforming setup table with the beamforming setup information obtained for the corresponding correspondent node in operation 217.

When the electronic device 100 ascertains that there is beamforming setup information corresponding to the changed identification information regarding a correspondent node in the beamforming setup table in operation 213, it may determine whether the beamforming setup information is valid in operation 219. For example, the validity of beamforming setup information may be performed by using location information regarding a correspondent node. As an example, when an amount of variation in distance and/or angle of a correspondent node are greater than or equal to a preset value, the electronic device 100 ascertains that beamforming setup information obtained from the beamforming setup table is not valid. When the electronic device 100 ascertains that beamforming setup information obtained from the beamforming setup table is not valid in operation 219, and the electronic device 100 proceeds with operations 215 and 217 as described above.

When the electronic device 100 ascertains that beamforming setup information obtained from the beamforming setup table is valid in operation 219, it may establish a beamforming link based on the obtained beamforming setup information and communicate data with the correspondent node via the established link in operation 221. That is, embodiments of the present disclosure are capable of efficiently establishing beamforming links for the changed correspondent nodes, without performing a beam search process.

FIGS. 3A, 3B, 4A, 4B, 5A and 5B are diagrams that describe first to third embodiments for performing a beam searching process.

The electronic device 100 may receive schedule information for data communication from, for example, an AP, and communicate data in a preset duration (interval) without conflict. This duration (interval) is called 'service period.' A terminal and an AP are capable of accessing wireless media using the service period. To this end, the AP may notify the terminal of the schedule information, periodically or non-periodically, via a beacon packet or packets such as announcement frames, using Extended Schedule Element. To make a notification, schedule information may be configured in a format as shown in FIG. 3B. Extended Schedule Element may include AID information regarding a source node (Source AID 311), AID information regarding a destination node (Designation AID 313), and a start point of scheduling duration (Allocation Start 314), and a block duration, (Allocation Block Duration 315).

Figure 3A:
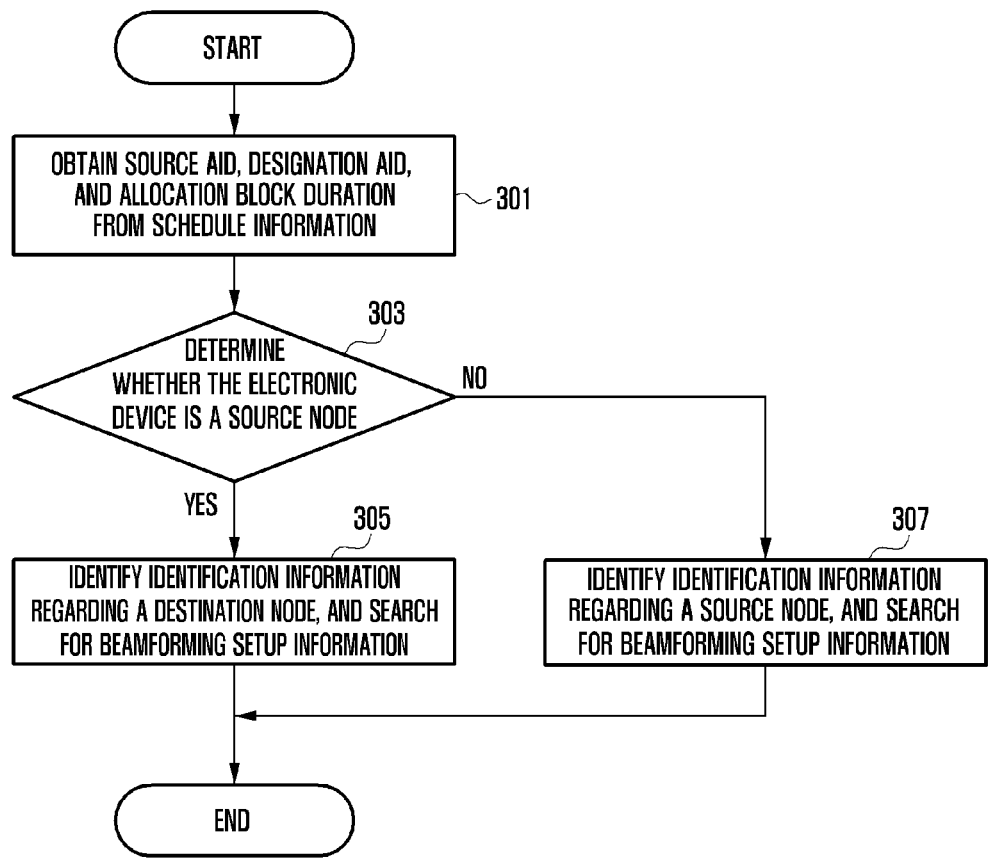
FIG. 3A is a flow diagram that describes a communication method using beamforming according to a first embodiment of the present disclosure.
Figure 3B:
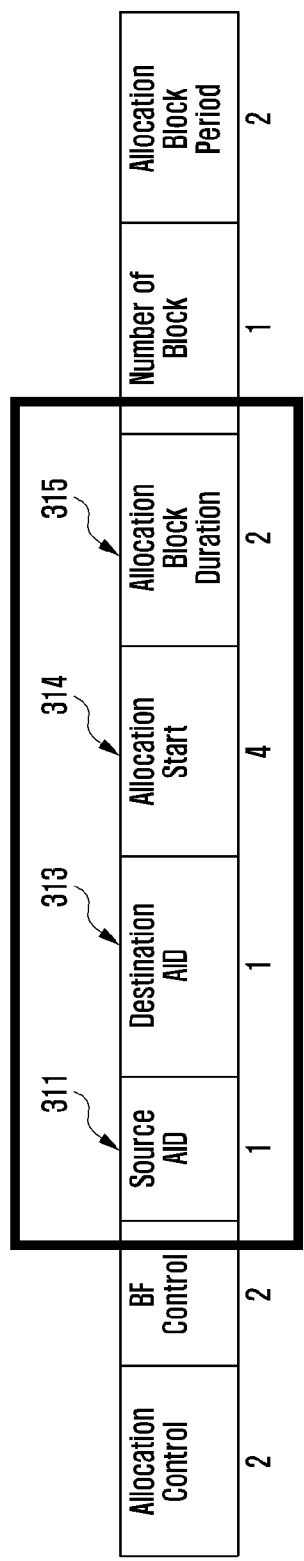
FIG. 3B is a diagram showing a format for schedule information according to a first embodiment of the present disclosure.

Referring to FIG. 3A, the electronic device 100 may obtain the AID information regarding a source node (Source AID 311), AID information regarding a destination node (Designation AID 313), and a start point of scheduling duration (Allocation Start 314), and a block duration, (Allocation Block Duration 315) from the schedule information in operation 301. The electronic device 100 may determine whether it is a source node in operation 303. For example, the electronic device 100 may determine whether it operates as an AP.

When the electronic device 100 is a source node in operation 303, it may identify identification information regarding a correspondent node based on the AID information regarding a destination node (Designation AID 313) from a user table, and search a beamforming setup table for beamforming setup information corresponding to the identified identification information in operation 305.

When the electronic device 100 is not a source node in operation 303, this indicates that it is a destination node. That is, when the electronic device 100 is a destination node, it may identify identification information regarding a correspondent node based on the AID information regarding a source node (Source AID 311) from a user table, and search for beamforming setup information corresponding to the identification information identified from the beamforming setup table in operation 307.

The electronic device 100 may obtain a node and a duration that it will communicate with, using the start point of scheduling duration (Allocation Start 314) and the Allocation Block Duration 315. Therefore, the electronic device 100 may perform a beamforming setup process based on the beamforming setup information obtained from the beamforming setup table, and communicate data with a correspondent node during the duration.

When the electronic device 100 does not have beamforming setup information or identification information regarding a correspondent node corresponding to the AID information obtained from the schedule information, it may obtain beamforming setup information regarding a correspondent node via a beam search process. After that, the electronic device 100 updates the beamforming setup information and the identification information regarding a correspondent node in the corresponding tables, respectively.

The electronic device 100 may communicate data through the schedule information. The electronic device 100 is also capable of communication of data via competition-based access to wireless media.

Figure 4A:
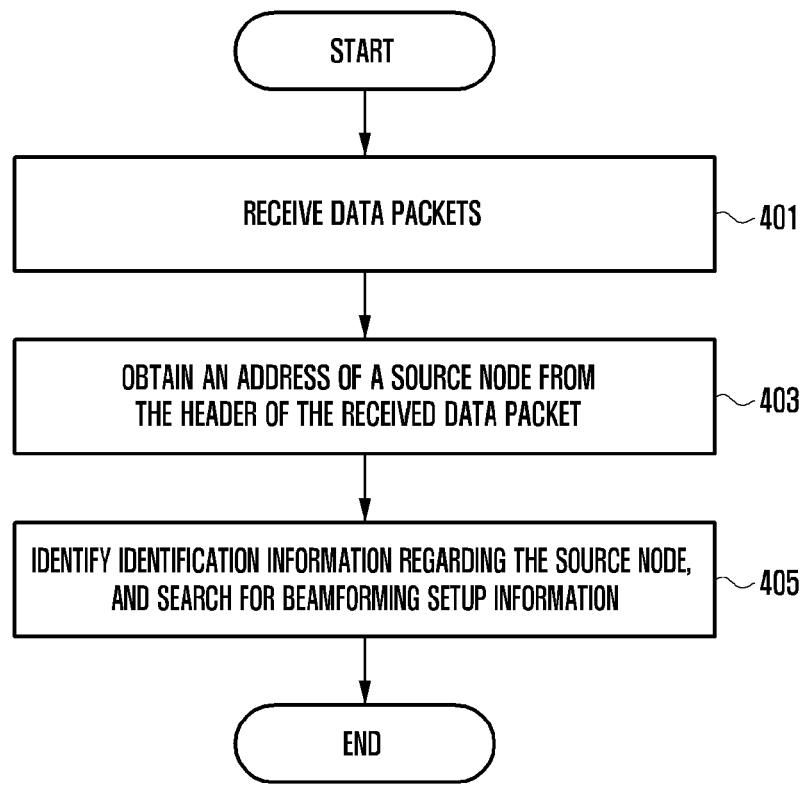
FIG. 4A is a flow diagram that describes a communication method using beamforming according to a second embodiment of the present disclosure.
Figure 4B:
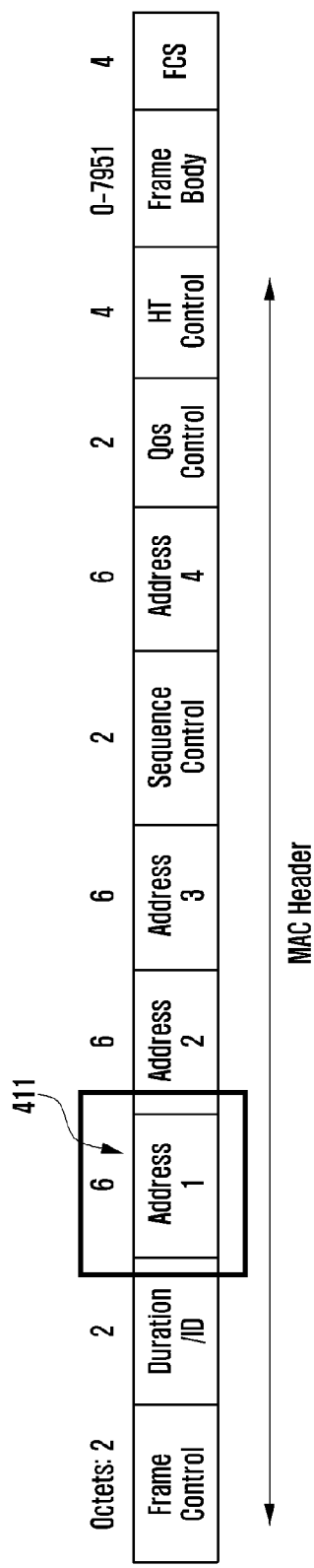
FIG. 4B is a diagram showing a format for a reception packet according to a second embodiment of the present disclosure.

Referring to FIG. 4A, the electronic device 100 may receive data packets from a correspondent node in operation 401. The received packets may have a format as shown in FIG. 4B, for example. The electronic device 100 may extract a MAC address 411 of a correspondent node from a MAC Header of the received packet in operation 403. For example, since the received packet may be stored in a memory, the electronic device 100 may extract a MAC address of a correspondent node from the MAC Header stored in the memory. The electronic device 100 may identify identification information regarding a correspondent node, i.e., a source node, based on the MAC address 411 extracted from the user table, and searching for beamforming setup information corresponding to the identification information identified from the beamforming setup table in operation 405.

Therefore, the electronic device 100 may perform a beamforming setup process based on the obtained beamforming setup information, and receive the following packet from a correspondent node, based on the set beamforming.

When the electronic device 100 does not have beamforming setup information or identification information regarding a correspondent node corresponding to the MAC address of a source node, obtained from the received packet, it may obtain beamforming setup information regarding a correspondent node via a beam search process. After that, the electronic device 100 updates the beamforming setup information and the identification information regarding a correspondent node in the corresponding tables, respectively.

Figure 5A:
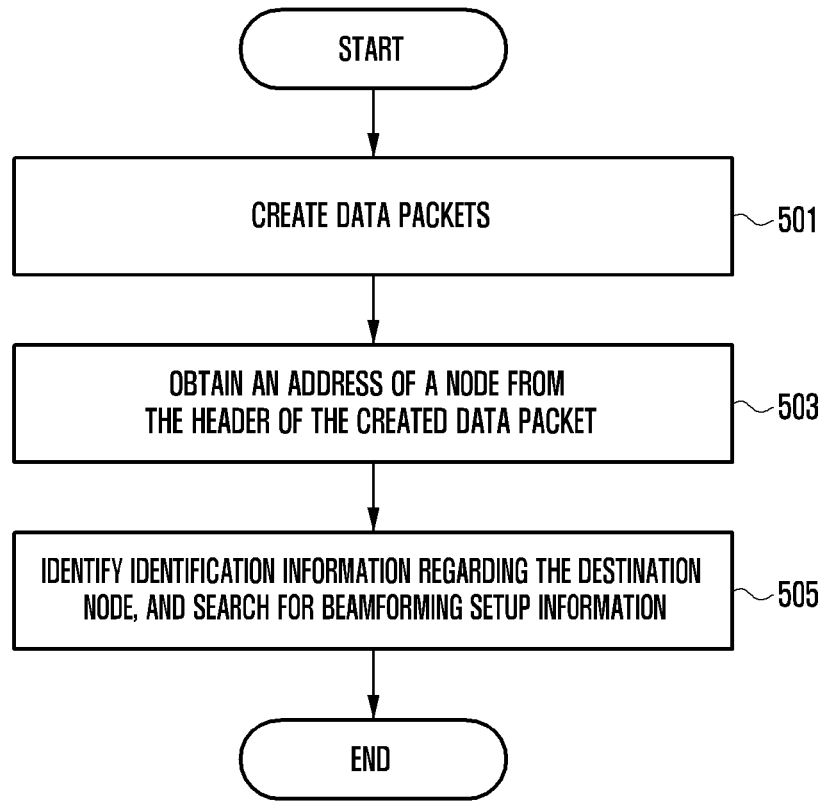
FIG. 5A is a flow diagram that describes a communication method using beamforming according to a third embodiment of the present disclosure.
Figure 5B:
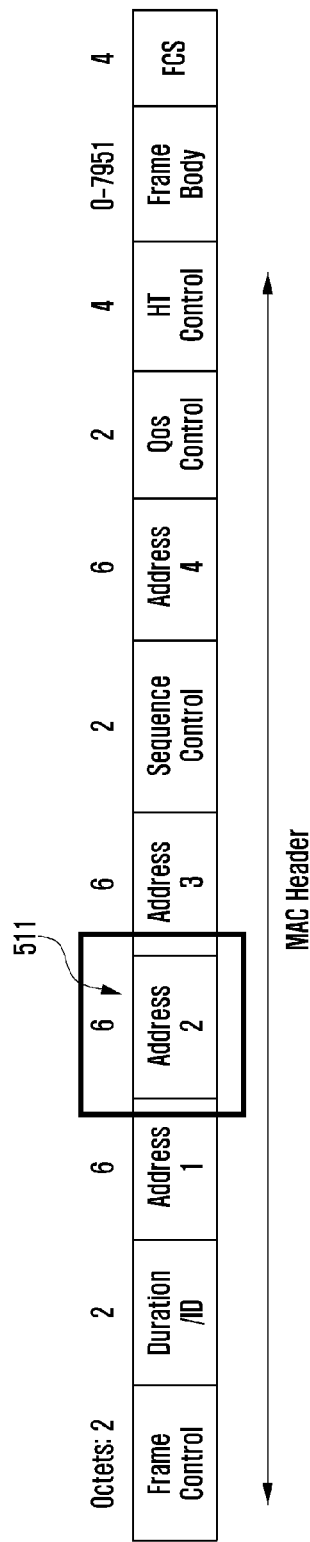
FIG. 5B is a diagram showing a format for a transmission packet according to a third embodiment of the present disclosure.

Referring to FIG. 5A, the electronic device 100 may create data packets to be transmitted to a correspondent node in operation 501. The electronic device 100 may extract information, from which identification information regarding a correspondent node can be made known, from a buffer or a memory storing packets, before transmitting the packets to a correspondent node, in operation 503. The packets to be transmitted may have a format as shown in FIG. 5B, for example. The electronic device 100 may extract a MAC address 511 of a correspondent node from a MAC Header of a corresponding packet. The electronic device 100 may identify identification information regarding a correspondent node, i.e., a destination node, based on the MAC address 511 extracted from the user table, and search for beamforming setup information corresponding to the identification information identified from the beamforming setup table in operation 505.

In order to transmit packets to a particular node, the electronic device 100 may perform a beamforming setup process for the node to establish a link before transmitting the packets, and transmit data packets to a correspondent node via the established link.

When the electronic device 100 does not have beamforming setup information or identification information regarding a correspondent node corresponding to the MAC address of a destination node, obtained from the received packet, it may obtain beamforming setup information regarding a correspondent node via a beam search process. After that, the electronic device 100 updates the beamforming setup information and the identification information regarding a correspondent node in the corresponding tables, respectively.

Figure 6:
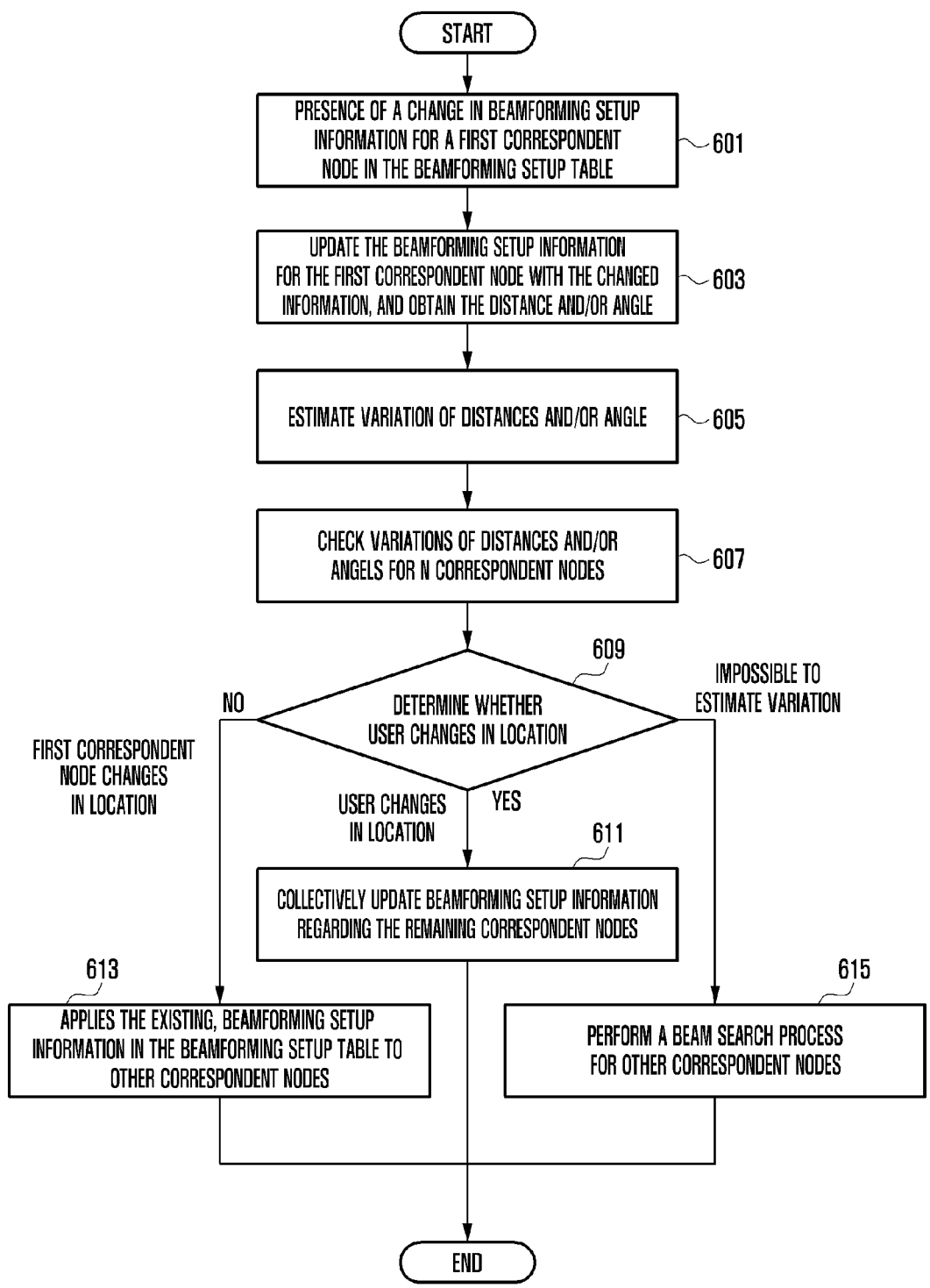
FIG. 6 is a flow diagram that describes a communication method of performing beamforming based a beamforming setup table, according to various embodiments of the present disclosure.

FIG. 6 is a flow diagram that describes a method of updating beamforming setup information using a trend of information changes in a beamforming setup table, according to various embodiments of the present disclosure.

According to various embodiments of the present disclosure, when the electronic device 100 manages beam table setup information for a plurality of correspondent nodes, it may determine the validity of beamforming setup information regarding correspondent nodes, using a trend of changes in beamforming setup information for part of the nodes. For example, when a user or a correspondent node is changed in location, the performance in setting beamforming by using a beamforming setup table may be aged. Therefore, the embodiment may determine the validity of beamforming setup table information using a trend of changes in beamforming setup information for part of the nodes to previously update the beamforming setup table previously or to re-search for an optimal beamforming setup via a beam search process without altering a beamforming setup based on the beamforming setup table information.

Referring to FIG. 6, beamforming setup information for a first correspondent node may change in the beamforming setup table stored in the electronic device 100 in operation 601. For example, when a beamforming link for a first correspondent node is aged or periodically updated, the beamforming setup information for the first correspondent node is considered to be updated.

The electronic device 100 may update the changed beamforming setup information for the first correspondent node in the beamforming setup table, and obtain the location information regarding the first correspondent node, e.g., distance and/or angle, in operation 603. The beamforming setup table may further include location information regarding the first correspondent node. The electronic device 100 may estimate a variation of locations, e.g., a variation of distances and/or angles, in operation 605.

When beamforming setup information regarding N correspondent nodes (N is a positive integer) was updated in the user table and the beamforming setup table, the electronic device 100 may have calculated and stored variation of the locations. Therefore, the electronic device 100 may check the variation of the latest locations of N correspondent nodes in operation 607.

The electronic device 100 may compare the variation of location of the first correspondent node with the variation of latest locations of N correspondent nodes, and determine whether a user location is changed, i.e., the location of the electronic device 100 is changed, in operation 609. For example, when the variation of locations of the first correspondent node tends to be identical to that of latest locations of N correspondent nodes, the electronic device 100 may ascertain that the user location has changed. In contrast, when the variation of locations of the first correspondent node is greater than or equal to a threshold, the electronic device 100 may ascertain that the first correspondent node has changed location. On the other hand, when the variation of locations of the first correspondent node and the variation of latest locations of N correspondent nodes tend to change to such an extent to be meaningless, the electronic device 100 may ascertain that it is impossible to estimate the location change of the first correspondent node or the user.

When the electronic device 100 ascertains that a user location has changed in operation 609, it may update beamforming setup information regarding the remaining correspondent nodes in the user table and the beamforming setup table, based on the change in beamforming setup information regarding the N correspondent nodes and the first correspondent node in operation 611. That is, the electronic device 100 may simultaneously or collectively update beamforming setup information in the beamforming setup table so that the information meets the location variation of user and is valid.

When the electronic device 100 ascertains that a location of the first correspondent node has changed in operation 609, it determines that the beamforming setup information regarding the other correspondent nodes configuring the beamforming setup table is valid and may use the existing beamforming setup information for the nodes in operation 613.

On the other hand, when the electronic device 100 ascertains that it is impossible to estimate the location change of the first correspondent node or the user in operation 609, it performs a beam search process to obtain beamforming setup information regarding other correspondent nodes, without using the beamforming setup table in operation 615. This is to minimize the probability of failure in communication of data when using the information in the existing beamforming setup table.

FIGS. 7A, 7B, 8A, 8B, and 9A are diagrams that describe a method of updating beamforming setup information using a trend of information changes in the beamforming setup table shown in FIG. 6.

Figure 7A:
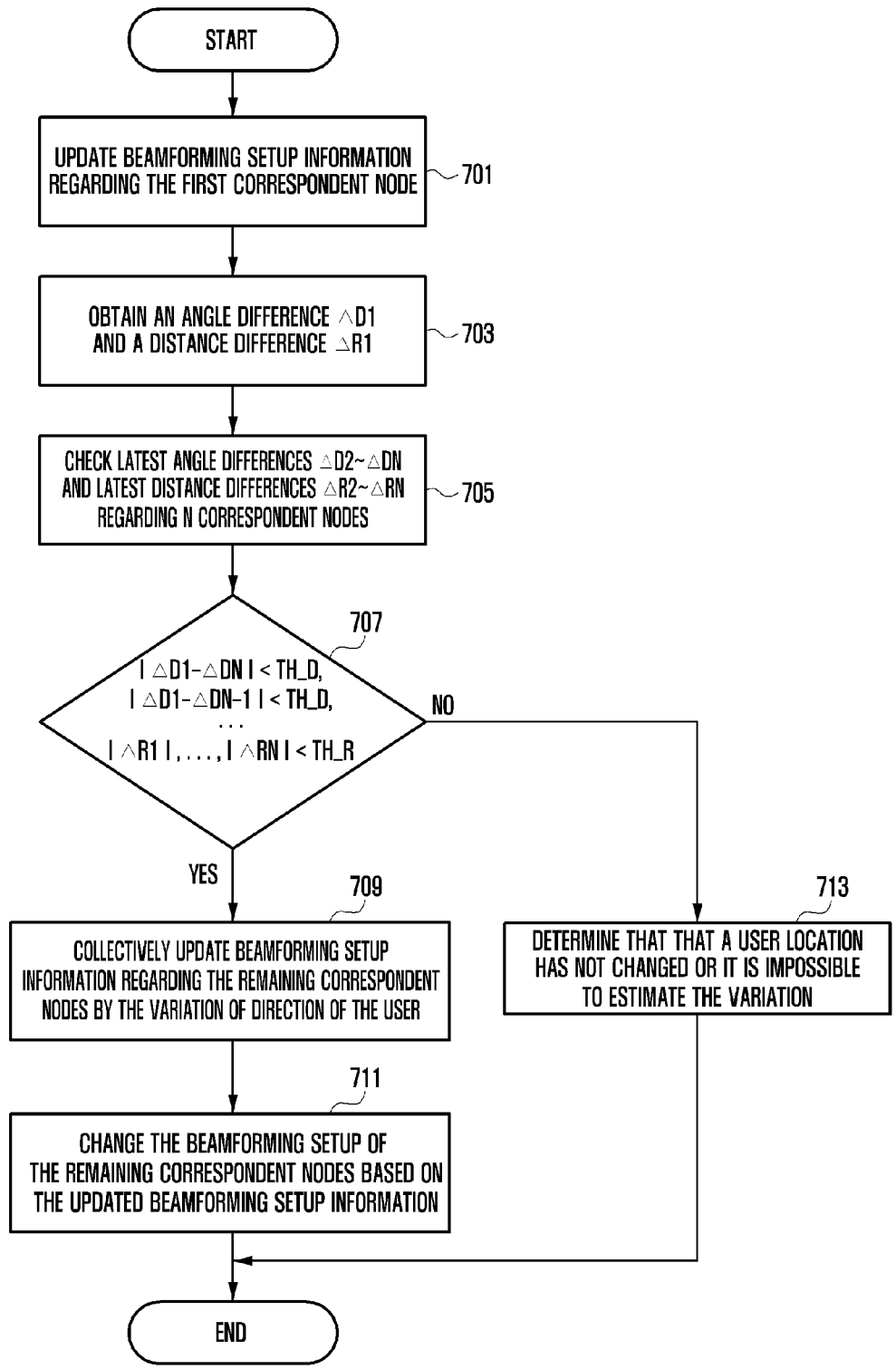
FIG. 7A is a flow diagram that describes a first embodiment of a communication method of performing beamforming based a beamforming setup table, according to the present disclosure.

Referring to FIG. 7A, an electronic device 720 may update beamforming setup information regarding the first correspondent node due to a link aging or a periodic update in operation 701. The electronic device 720 may obtain a variation of location information regarding the first correspondent node, e.g., an angle difference $\Delta D1$ and a distance difference $\Delta R1$, in operation 703. The electronic device 720 may check variations of latest location information regarding N correspondent nodes, e.g., angle differences $\Delta D2 \sim \Delta DN$ and distance differences $\Delta R2 \sim \Delta RN$, in operation 705.

The electronic device 720 may compare the variation of location of the first correspondent node with the variation of latest locations of N correspondent nodes, and determine whether a user location is changed in operation 707. For example, the electronic device 720 compares the variations of angles and distances between the first correspondent node and N correspondent nodes, i.e., angle differences $\Delta D1 \sim \Delta DN$ and distance differences $\Delta R1 \sim \Delta RN$. When the electronic device 720 ascertains that the angle differences and distance differences are constant and they are less than or equal to corresponding thresholds respectively, it determines that the direction of the user has changed as shown in FIG. 7B.

When the electronic device 720 determines that the direction of the user has changed, it may collectively update beamforming setup information regarding the remaining correspondent nodes, based on the variation of direction of the user, in operation 709. The electronic device 720 may change the beamforming setup of the remaining correspondent nodes based on the updated beamforming setup information, and communicate data via the changed beamforming setup in operation 711.

On the other hand, when the electronic device 720 ascertains that the conditions are not satisfied in operation 707, it determines that that a user location has not changed or it is impossible to estimate the variation in operation 713. In this case, the electronic device 720 performs a beam search process to obtain beamforming setup information regarding the remaining correspondent nodes, without using the information in the beamforming setup table.

Figure 7B:
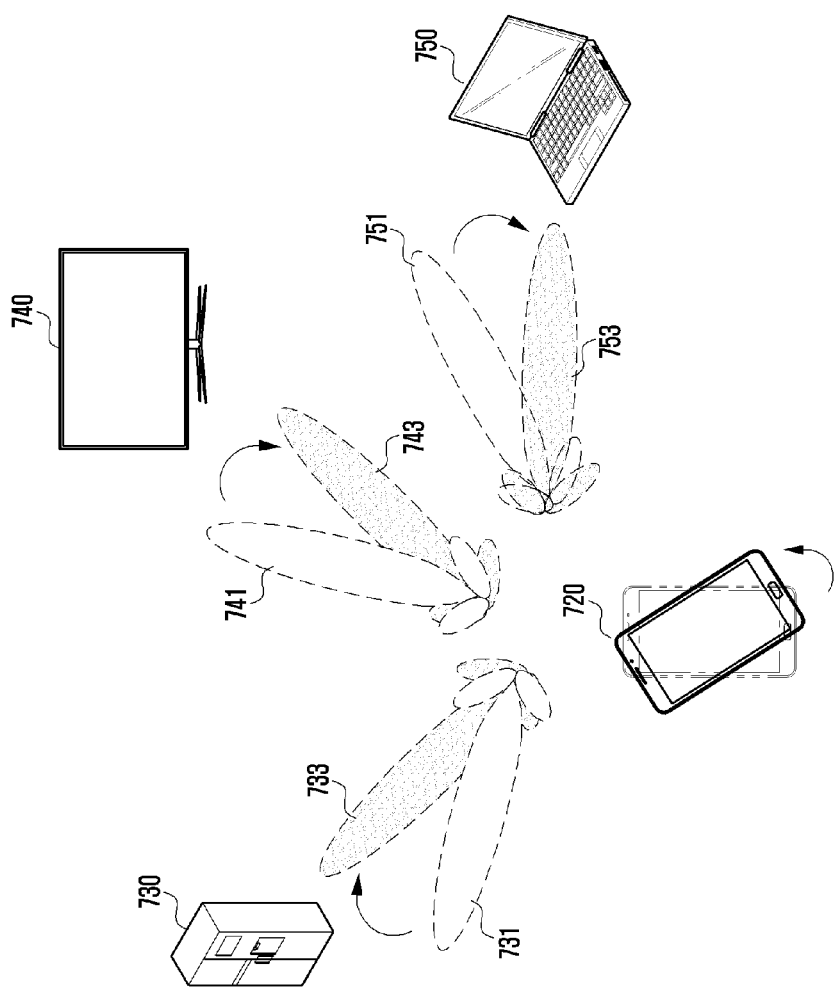
FIG. 7B is a diagram that describes a first embodiment of a communication method of performing beamforming based a beamforming setup table, according to the present disclosure.

Referring to FIG. 7B, in a state where an electronic device 720 is establishing first links 731~751 with first to third correspondent nodes 730~750 through a first beamforming setup, respectively, when the electronic device 720 ascertains that the direction of the user has changed when updating the beamforming setup information regarding the first correspondent node 730, it may collectively update beamforming setup information regarding the remaining nodes 740 and 750 based on the variation of direction of the user. Therefore, the electronic device 720 that has changed in direction may establish second links 733~753 with the first to third correspondent nodes 730~750.

Figure 8A:
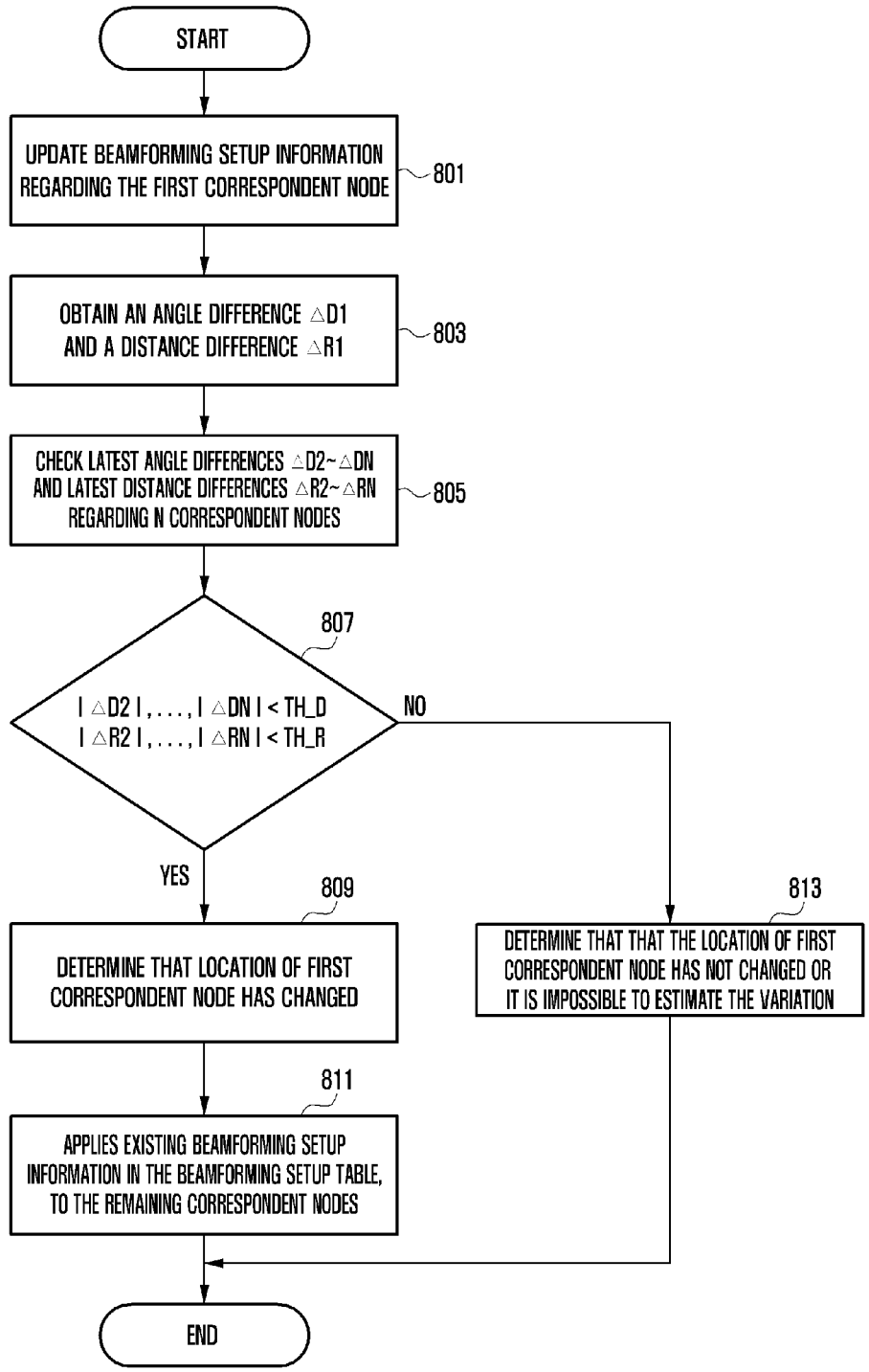
FIG. 8A is a flow diagram that describes a second embodiment of a communication method of performing beamforming based a beamforming setup table, according to the present disclosure.

Referring to FIG. 8A, an electronic device 820 may update beamforming setup information regarding the first correspondent node due to a link aging or a periodic update in operation 801. The electronic device 820 may obtain a variation of location information regarding the first correspondent node, e.g., an angle difference $\Delta D1$ and a distance difference $\Delta R1$, in operation 803. The electronic device 820 may check variations of latest location information regarding N correspondent nodes, e.g., angle differences $\Delta D2 \sim \Delta DN$ and distance differences $\Delta R2 \sim \Delta RN$, in operation 805.

The electronic device 820 may compare the variation of location of the first correspondent node with the variation of latest locations of N correspondent nodes, and determine whether only a location of correspondent node is changed in operation 807. For example, when the electronic device 820 ascertains that the angle and distance of the first correspondent node have changed and the angle differences and the distance differences of N correspondent nodes are less than or equal to corresponding thresholds respectively, it determines that only the direction of corresponding correspondent node has changed as shown in FIG. 8B.

When the electronic device 820 ascertains the conditions are satisfied in operation 807, it determines that the location of the first correspondent node has changed in operation 809. In this case, the electronic device 820 determines that the beamforming setup information regarding the remaining correspondent nodes except for the first correspondent node is valid, and uses the information in operation 811.

On the other hand, when the electronic device 820 ascertains the conditions are not satisfied in operation 807, it determines that the location of the first correspondent node has not changed or it is impossible to estimate the variation in operation 813. In this case, the electronic device 820 performs a beam search process to obtain beamforming setup information regarding the remaining correspondent nodes, without using the information in the beamforming setup table.

Figure 8B:
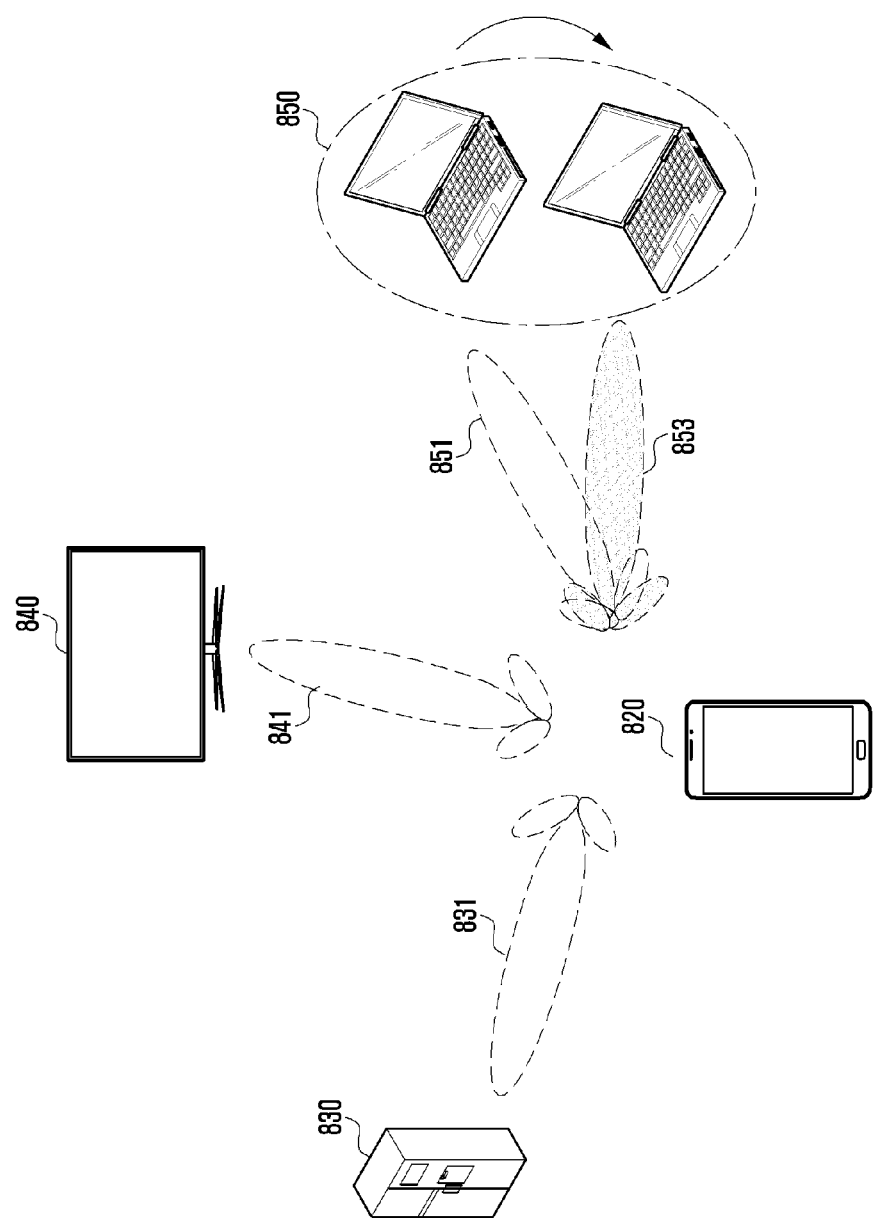
FIG. 8B is a diagram that describes a second embodiment of a communication method of performing beamforming based a beamforming setup table, according to the present disclosure.

Referring to FIG. 8B, in a state where an electronic device 820 is establishing first links 831~851 with first to third correspondent nodes 830~850 through a first beamforming setup, respectively, the electronic device 820 determines that the direction of the third correspondent node 850 has changed when updating the beamforming setup information regarding the third correspondent node 850. In this case, the electronic device 820 determines that the beamforming setup information regarding the remaining correspondent nodes 830 and 840 is valid in the beamforming setup table, and uses the information. Therefore, the electronic device 820 may establish a second link 853 with only the third correspondent node 850 that has changed in direction, by updating the beamforming setup information.

Figure 9A:
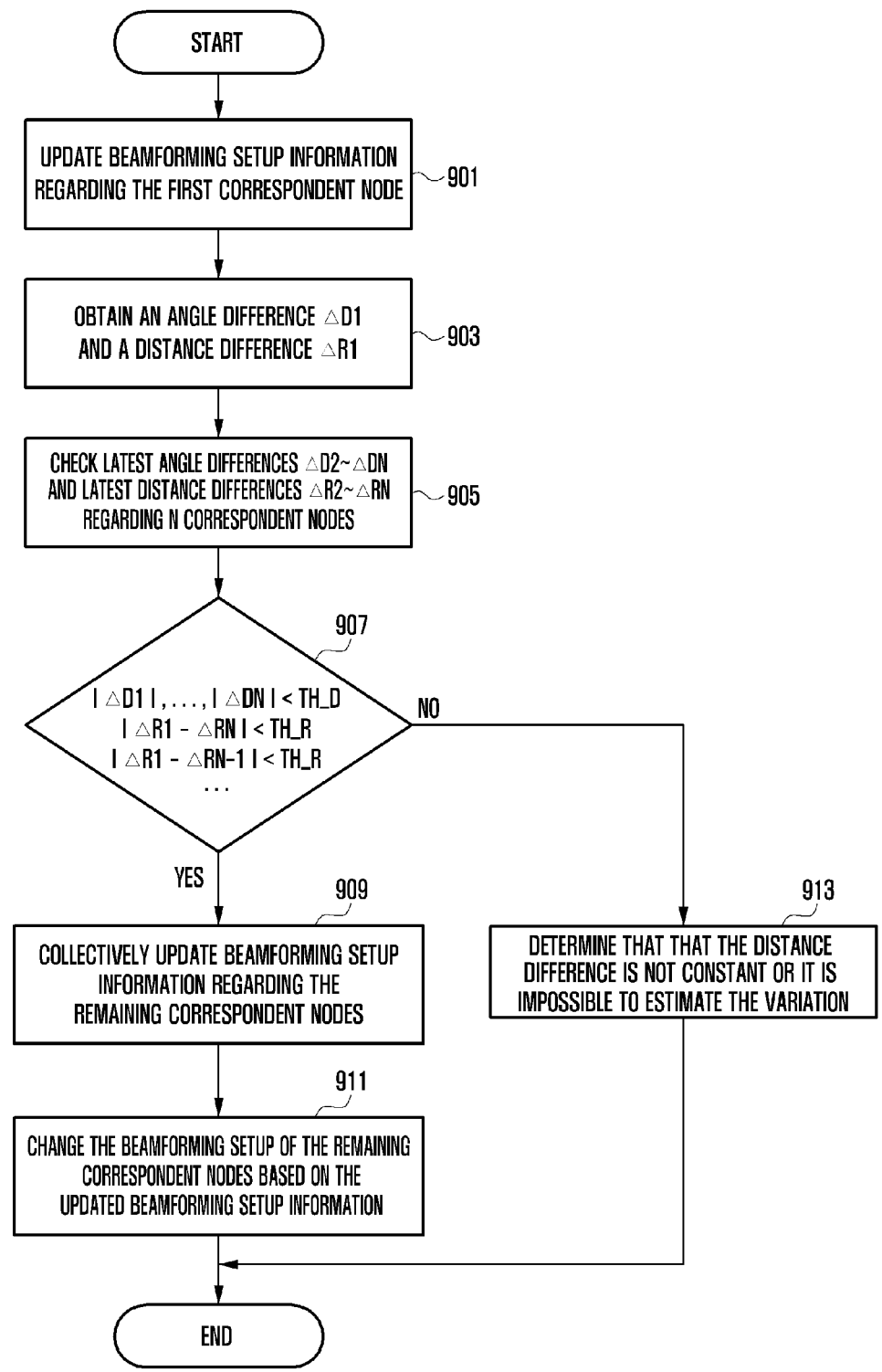
FIG. 9A is a flow diagram that describes a third embodiment of a communication method of performing beamforming based a beamforming setup table, according to the present disclosure.

Referring to FIG. 9A, an electronic device 920 may update beamforming setup information regarding the first correspondent node due to a link aging or a periodic update in operation 901. The electronic device 920 may obtain a variation of location information regarding the first correspondent node, e.g., an angle difference $\Delta D1$ and a distance difference $\Delta R1$, in operation 903. The electronic device 920 may check variations of latest location information regarding N correspondent nodes, e.g., angle differences $\Delta D2$~$\Delta DN$ and distance differences $\Delta R2$~$\Delta RN$, in operation 905.

The electronic device 920 may compare the variation of location of the first correspondent node with the variation of latest locations of N correspondent nodes, and determine whether a user location (distance) is changed in operation 907. For example, the electronic device 920 compares the variations of angles and distances between the first correspondent node and N correspondent nodes, i.e., angle differences $\Delta D1$~$\Delta DN$ and distance differences $\Delta R1$~$\Delta RN$. When the electronic device 920 ascertains that the distance differences are constant and the angle differences are less than or equal to a threshold, it determines that the location of the user has changed as shown in FIG. 9B.

When the electronic device 920 determines that the location of the user has changed, it may collectively update beamforming setup information regarding the remaining correspondent nodes, based on the variation of distance of the user, in operation 909. The electronic device 920 may change the beamforming setup of the remaining correspondent nodes based on the updated beamforming setup information, and communicate data via the changed beamforming setup information in operation 911.

On the other hand, when the electronic device 920 ascertains the conditions are not satisfied in operation 907, it determines that that a user location has not changed or it is impossible to estimate the variation in operation 913. In this case, the electronic device 920 performs a beam search process to obtain beamforming setup information regarding the remaining correspondent nodes, without using the information in the beamforming setup table.

Figure 9B:
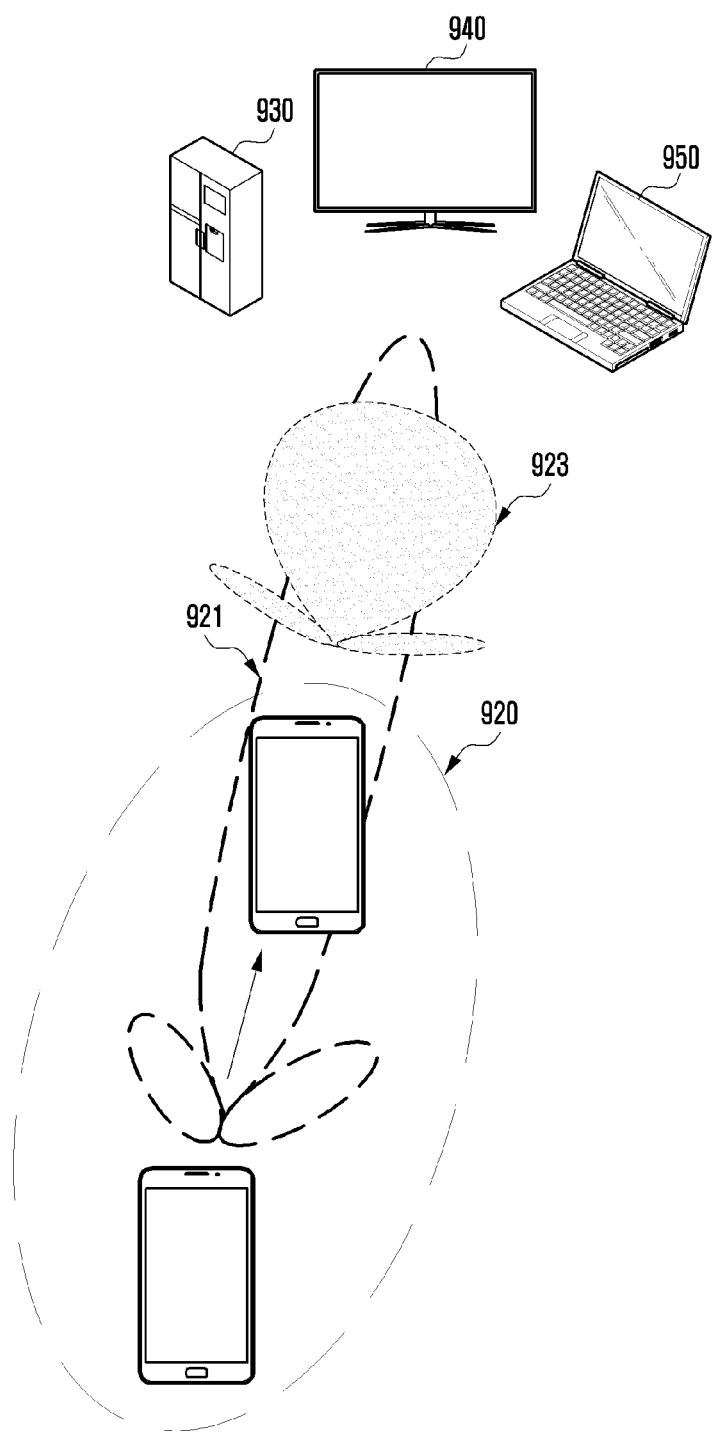
FIG. 9B is a diagram that describes a third embodiment of a communication method of performing beamforming based a beamforming setup table, according to the present disclosure.

Referring to FIG. 9B, in a state where an electronic device 920 is establishing a first link 921 with first to third correspondent nodes 930~950 through a first beamforming setup, when the electronic device 920 ascertains that the location of the user has changed (i.e., the user is located close to the first correspondent node 930) when updating the beamforming setup information regarding the first correspondent node 930, it may collectively update beamforming setup information regarding the remaining nodes 940 and 950 based on the variation of distance of the user. Therefore, the electronic device 920 that has changed in location may establish a second link 923 with the first to third correspondent nodes 930~950. For example, since the distance between the electronic device 920 and nodes 930~950 is reduced (i.e., they are close to each other), the embodiment enables the electronic device 920 to reduce the number of antennas or increase the beam width, thereby reducing the power consumption and providing a relatively high stability of the link.

Figure 10:
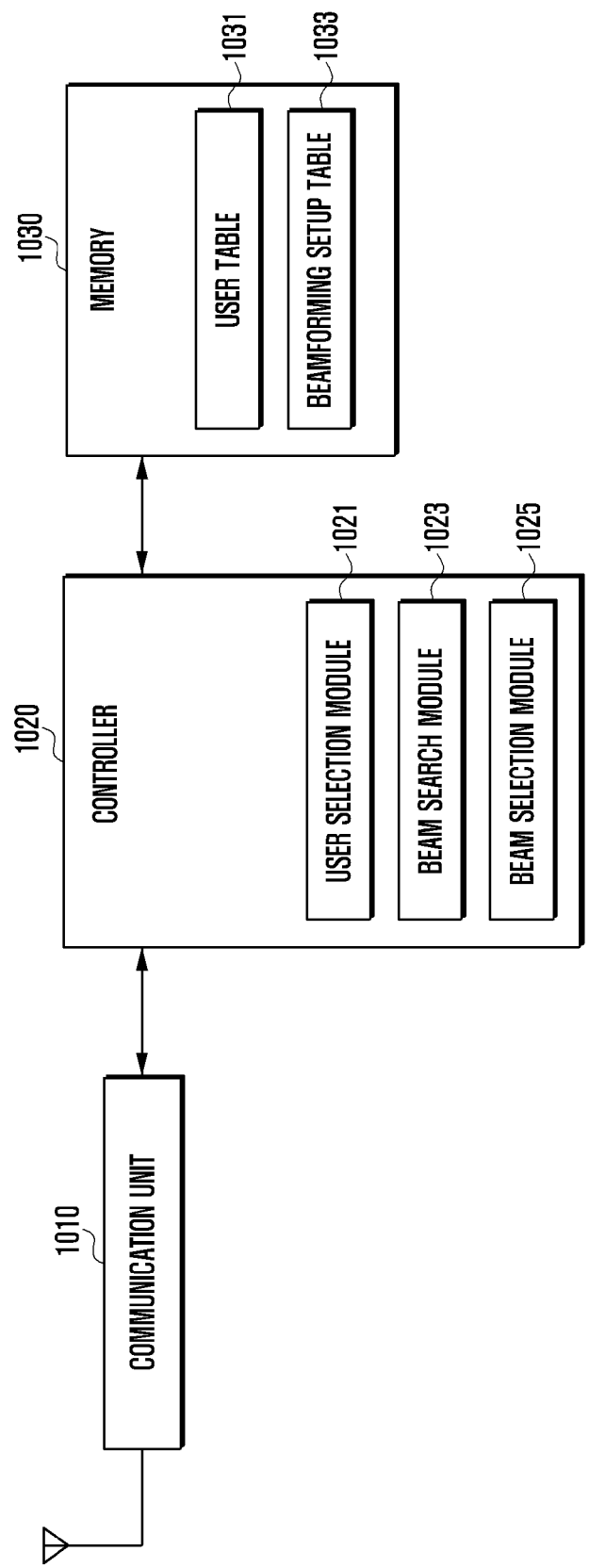
FIG. 10 is a schematic block diagram showing an electronic device that makes wireless communication using beamforming according to various embodiments of the present disclosure.

FIG. 10 is a schematic block diagram showing an electronic device 100 that makes wireless communication using beamforming according to various embodiments of the present disclosure.

Referring to FIG. 10, the electronic device 100 may include a communication unit 1010, a controller 1020 and a memory 1030.

The communication unit 1010 may communicate signals with at least one correspondent node. For example, the communication unit 1010 may include at least one antenna module to perform beamforming according to the control of the controller 1020. The communication unit 1010 may include a communication unit 250 shown in FIG. 2B.

The memory 1030 may store a user table 1031 and a beamforming setup table 1033. The user table 1031 includes identification information regarding at least one correspondent node. The beamforming setup table 1033 includes beamforming setup information mapped to the identification information. The beamforming setup information according to various embodiments of the present disclosure may include at least one of the following: a sector level sweep (SLS) beam ID, a beam refinement protocol (BRP) beam ID, an antenna module ID, antenna mode information used for selecting one of the antenna arrays, and RF mode information used for selecting one of the antenna elements in the selected antenna array.

The controller 1020 may identify identification information regarding a correspondent node, from the user table 1031, based on one of the following: a transmission packet, a reception packet, and schedule information. The controller 1020 may identify beamforming setup information corresponding to the identification information regarding a correspondent node from the beamforming setup table 1033. The controller 1020 controls the communication unit 1010 based on the identified beamforming setup information, to establish a beamforming link with the correspondent node and to transmit/receive or communicate data via the beamforming link.

In an embodiment, the controller 1020 may determine whether the beamforming setup information identified from the beamforming setup table 1033 is valid. When the controller 1020 ascertains that the identified beamforming setup information is valid, it may establish a beamforming link with a correspondent node based on the identified beamforming setup information. The controller 1020 may determine whether the identified beamforming setup information is valid, based on the variations of location of the correspondent node, e.g., a variation of distances or a variation of angles. When the controller 1020 ascertains that the identified beamforming setup information is not valid, it performs a beam search process to obtain beamforming setup information regarding the correspondent node. The controller 1020 may update the beamforming setup table 1033 with the obtained beamforming setup information.

For example, the controller 1020 may include a user selection module 1021, a beam search module 1023 and a beam selection module 1025.

The user selection module 1021 may identify identification information regarding a correspondent node from the user table 1031, based on an AID or a MAC address of the correspondent node from schedule information, a reception packet or a transmission packet. The AID of a correspondent node in the schedule information may be provided by, for example, a scheduler (not shown). The MAC address of a correspondent node in the reception or transmission packet may be provided by, for example, the communication unit 1010.

The beam search module 1023 may perform a beam search process for a correspondent node to obtain optimal beamforming setup information. When the beam search module 1023 does not identify beamforming setup information corresponding to the identification information regarding a correspondent node from the beamforming setup table 1033, it may obtain the beamforming setup information regarding the correspondent node via the beam search process. The beam search module 1023 may update the beamforming setup table 1033 with the obtained beamforming setup information.

The beam selection module 1025 may manage beamforming setup information mapped to identification information regarding a correspondent node that the user selection module 1021 selected from the beamforming setup table 1033. For example, when the beam selection module 1025 obtains beamforming setup information mapped to the identification information regarding the selected correspondent node via a beam search process, etc., it may update the beamforming setup table 1033 with the obtained information. In addition, the beam selection module 1025 may identify beamforming setup information mapped to the identification information regarding the selected correspondent node, from the beamforming setup table 1033.

In various embodiments of the present disclosure, when beamforming setup information regarding a correspondent node is updated in the beamforming setup table 1033, the controller 1020 may obtain a variation of locations of the correspondent node. The controller 1020 may compare the obtained variation of locations of the correspondent node with a variation of latest locations of at least one of the other correspondent nodes. The memory 1030 may have stored a variation of latest locations of at least one correspondent node, e.g., a variation of distances or a variation of angles.

When the controller 1020 ascertains that the location of the electronic device 100 has changed from the comparison, e.g., both or either when the direction of the electronic device 100 is changed and/or the distance between the electronic device 100 and the correspondent node is adjusted, the controller 1020 may update beamforming setup information regarding the remaining correspondent nodes, not applied to the location variation of the electronic device 100, in the beamforming setup table 1033, based on the variation of locations of the electronic device 100.

On the other hand, when the controller 1020 ascertains that the location of the correspondent node has changed from the comparison, it may use the existing beamforming setup information for the remaining correspondent nodes in the beamforming setup table 1033.

Various embodiments of the present disclosure are capable of using beamforming setup information stored in tables each time that correspondent nodes are changed, without performing a beam search, thereby reducing the overhead and performing efficient communication of data.

In addition, various embodiments of the present disclosure are capable of updating the validity of beamforming setup information stored in tables, thereby performing precise beamforming for a correspondent node.

Each of the elements/units of the electronic device according to various embodiments of the present disclosure may be implemented with one or more components, and be called different names according to types of electronic devices. The electronic device according to various embodiments of the present disclosure may include one or more elements described above. The electronic device may be modified in such a way as to: remove part of the elements or include new elements. In addition, the electronic device according to various embodiments of the present disclosure may also be modified in such a way that parts of the elements are integrated into one entity that performs their original functions.

In the present disclosure, the terminology '~unit,' '~device,' or '~ module' refers to a 'unit' including hardware, software, firmware or a combination thereof. For example, the terminology '~unit,' '~device,' or '~ module' is interchangeable with '~ logic,' '~ logical block,' '~ component,'' ~ circuit,' etc. A terminology '~unit,' '~device,' or '~ module' may be the least unit or a part of an integrated component. A terminology '~unit,' '~device,' or '~ module' may be the least unit or a part thereof that can perform one or more functions. A terminology '~unit,' '~device,' or '~ module' may be implemented in mechanical or electronic mode. For example, '~unit,' '~device,' or '~ module' according to various embodiments of the present disclosure may be implemented with one or more of the following: an application specific integrated circuit (ASIC) chip, field-programmable gate array (FPGAs) and a programmable-logic device that can perform functions that are known or will be developed.

The embodiments of the present disclosure described in the description and drawings are merely provided to assist in a comprehensive understanding of the disclosure and are not suggestive of limitation. Although embodiments of the disclosure have been described in detail above, it should be understood that many variations and modifications of the basic inventive concept herein described, which may be apparent to those skilled in the art, will still fall within the spirit and scope of the embodiments of the disclosure as defined in the appended claims.

What is claimed is:

1. An electronic device for performing wireless communication using beamforming comprising:
a memory that stores a beamforming setup table;
a transceiver configured to communicate signals with a first node based on the beamforming setup table; and
a controller configured to:
identify at least one of scheduling information received from a second node, a reception packet received from the second node, and a transmission packet to be transmitted from the electronic device to the second node, identify identification information corresponding to the second node included in the at least one of schedule information, the reception packet and the transmission packet, determine whether beamforming setup information corresponding to the identification information is included in the beamforming setup table, establish a beamforming link with the second node based on the beamforming setup information when the beamforming setup information corresponding to the second node is included in the beamforming setup table, and perform a beam search process for establishing a beamforming link with the second node, when the beamforming setup information corresponding to the second node is not included in the beamforming setup table.

2. The electronic device of claim 1, wherein:
the memory stores a user table; and
the controller identifies identification information on each of the first node and the second node, corresponding to an address or an identification (ID) included in the reception packet, the transmission packet, or the schedule information, based on the user table.

3. The electronic device of claim 1, wherein, when beamforming setup information corresponding to the identification information of the second node is not included in the beamforming setup table, the controller obtains beamforming setup information associated with the second node by the performed beam search process and updates the beamforming setup table with the beamforming setup information obtained by the controller.

4. The electronic device of claim 1, wherein the controller:
determines whether the beamforming setup information identified is valid;
establishes, when ascertaining that the beamforming setup information identified is valid, a beamforming link with the second node, based on the beamforming setup information identified; and
obtains, when ascertaining that the beamforming setup information identified is not valid, beamforming setup information associated with the second node, by performing a beam search process, to update the beamforming setup table with the beamforming setup information obtained.

5. The electronic device of claim 4, wherein:
the beamforming setup table comprises location information associated with the second node, including a distance and/or an angle with respect to the second node; and
the controller determines whether the beamforming setup information identified is valid, using the location information associated with the second node.

6. The electronic device of claim 1, wherein the beamforming setup information comprises at least one of:
a sector level sweep (SLS) beam ID, a beam refinement protocol (BRP) beam ID, an antenna module ID, antenna mode information related to a beam-steering direction or polarization characteristics of an antenna element, and RF mode information controlling a beam width of an antenna array.

7. The electronic device of claim 1, wherein, when beamforming setup information associated with the second node is updated in the beamforming setup table, the controller obtains a variation of location of the second node and compares the variation of location obtained with a variation of latest location of at least one third node.

8. The electronic device of claim 7, wherein, when the controller ascertains that a location of the electronic device has changed based on the comparison, the controller updates beamforming setup information associated with the first node that do not apply the variation of location to the beamforming setup table, based on a variation of user location.

9. The electronic device of claim 7, wherein, when the controller ascertains that a location of the second node has changed based on the comparison, the controller applies existing beamforming setup information to the first node in the beamforming setup table.

10. A method for an electronic device to perform wireless communication using beamforming, the method comprising:
communicating with a first node based on a beamforming setup table stored in the electronic device;
identifying at least one of scheduling information received from a second node, a reception packet received from the second node, and a transmission packet to be transmitted from the electronic device to the second node;
identifying identification information corresponding to the second node included in the at least one of schedule information, the reception packet and the transmission packet;
determining whether beamforming setup information corresponding to the identification information is included in the beamforming setup table;
establishing a beamforming link with the second node based on the beamforming setup information when the beamforming setup information corresponding to the second node is included in the beamforming setup table; and
establishing a beamforming link with the second node based on a beam search process for the second node, when the beamforming setup information corresponding to the second node is not included in the beamforming setup table.

11. The method of claim 10, wherein identifying identification information regarding a correspondent node comprises:
identifying the identification information on each of the first node and the second node, corresponding to an address or an identification (ID) included in the reception packet, the transmission packet, or the schedule information, based on a stored, user table.

12. The method of claim 10, further comprising:
when beamforming setup information corresponding to the identification information of the second node is not included in the beamforming setup table, obtaining beamforming setup information associated with the second node by the beam search process; and
updating the beamforming setup table with the beamforming setup information obtained.

13. The method of claim 10, further comprising:
determining whether the beamforming setup information that has been identified is valid.

14. The method of claim 13, wherein establishing a beamforming link comprises:
when ascertaining that the beamforming setup information that has been identified is valid, establishing a beamforming link with the second node, based on the beamforming setup information that has been identified; and when ascertaining that the beamforming setup information that has been identified is not valid, obtaining beamforming setup information associated with the second node, by performing a beam search process, to establish a beamforming link with the second node based on the beamforming setup information obtained.

15. The method of claim 14, further comprising:
updating the beamforming setup table with the beamforming setup information associated with the second node, obtained by performing a beam search process.

16. The method of claim 13, wherein:
the beamforming setup table comprises location information associated with the second node, including a distance and/or an angle with respect to the second node; and
determining whether the beamforming setup information that has been identified is valid is performed using the location information associated with the second node.

17. The method of claim 10, wherein the beamforming setup information comprises at least one of:
a sector level sweep (SLS) beam ID, a beam refinement protocol (BRP) beam ID, an antenna module ID, antenna mode information related to a beam-steering direction or polarization characteristics of an antenna element, and RF mode information controlling a beam width of an antenna array.

18. The method of claim 10, further comprising:
when beamforming setup information associated with the second node is updated in the beamforming setup table, obtaining a variation of location of the second node; and
comparing the variation of location obtained with a variation of latest location of at least one third node.

19. The method of claim 18, further comprising:
when a location of the electronic device has changed based on the comparison, detecting a variation of user location; and
updating beamforming setup information associated with the first node that does not apply the variation of user location to the beamforming setup table, based on the variation of user location.

20. The method of claim 18, further comprising:
when a location of the second node has changed based on the comparison, applying existing beamforming setup information to the first node in the beamforming setup table.

* * * * *